United States Patent Office 2,713,058
Patented July 12, 1955

2,713,058

MANUFACTURE OF N-TRICHLOROMETHYL-THIOIMIDES

Allen R. Kittleson, Cranford, N. J., assignor to Esso Research and Engineering Company, a corporation of Delaware No Drawing. Application August 28, 1952,
Serial No. 306,950

7 Claims. (Cl. 260—326)

This invention relates to new and useful improvements in the preparation of N-trichloromethylthioimides and more particularly to improved methods for the obtaining of higher yields of pure N-trichloromethylthioimides.

There were disclosed in U. S. Patent No. 2,553,770, as new compounds, N-trichloromethylthioimides. These compounds were disclosed to be effective parasiticides and especially effective fungicides.

N-trichloromethylthioimides are compounds in which the >NSCCl₃ group is linked to two acyl groups. The phrase "acyl group" refers to groups of the following character

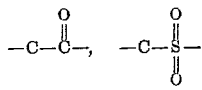

etc. (see Hackh, "Chemical Dictionary," second edition, page 21). The compounds are thus properly regarded as N-trichloromethylthioimides (or N-thiotrichloromethylimides) (see Sidgewick's "Organic Chemistry of Nitrogen," 1937 edition, pages 136 and 152).

The imide compounds of the indicated type are illustrated by Formula I:

FORMULA I

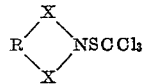

in which R represents an organic radical, nucleus, or one or more organic residues and X is part of an acyl group, such as, for example,

and

The R may be aliphatic, aromatic, alicyclic, heterocyclic, and their substituted derivatives.

These compounds have been prepared by the general method disclosed in U. S. Patent No. 2,553,771 of dissolving the desired imide in aqueous alkaline solution followed by addition of about an equal molecular quantity of perchloromethyl mercaptan. The mixture was stirred rapidly, conveniently until the aqueous medium became acid to litmus, then filtered and air dried. The reaction is conveniently carried out at room temperature. In cases where the imide is readily hydrolyzed in alkaline solutions, it is advantageous to cool the reaction mixture to temperatures as low as 0° C.

The metal compound used to supply the necessary alkaline solution is a compound of an alkali metal such as lithium, sodium and potassium, and the like. Because of cost factors, sodium and potassium are preferred. The alkali is present preferably in amounts equivalent to the imide used. While other basic compounds may be used, it is desirable to use the alkali hydroxides because of the consequent avoidance of the presence of other anion radicals which might have to be removed.

It is believed that the solution of the imide and the alkali hydroxide solution results in the formation of alkali metal imide salt which reacts with the perchloromethyl mercaptan.

This reaction is illustrated by Formula II below, where M represents an alkali metal.

FORMULA II

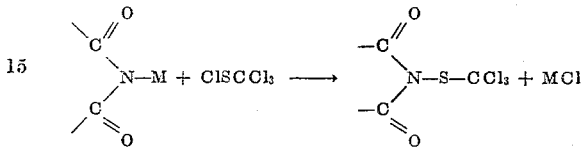

The purity of the desired products is important because of their use on plant materials and the fact that they are handled by agricultural workers in the field. It is therefore desirable to have these products as free as possible of lachrymatory and corrosive impurities. These impurities can sometimes occur because of the presence of perchloromethyl mercaptan or its degradation products in the final product.

The present invention is an improved method of making N-trichloromethylthioimides which overcomes these difficulties. The method comprises carrying out the reaction of perchloromethyl mercaptan with the alkali metal imide product dissolved in the aqueous media in the presence of a water-immiscible, saturated organic solvent for the perchloromethyl mercaptan. The latter is preferably added to the reaction system dissolved in the organic solvent and results in the obtaining of products of substantially increased purity.

The higher purity obtained in this invention is unexpected in that the reaction is between essentially water-insoluble perchloromethyl mercaptan and water-soluble alkali metal imide. The addition of a water-immiscible solvent for the perchloromethyl mercaptan does not result in a homogeneous system, but the greater purity obtained is extremely important.

The characteristics necessary for the saturated organic solvent utilized in the process of this invention are that they must dissolve perchloromethyl mercaptan and be inert to it, they must be poor solvents for the N-trichloromethylthioimides or similar products, and they must be relatively volatile. These characteristics are particularly found in the C₅ through C₉ saturated hydrocarbons. These hydrocarbons should preferably be aliphatic in nature, but naphthenes can also be utilized. Some of the hydrocarbons that therefore can be used in the process of this invention include heptane, hexane, cyclohexane, virgin naphtha in the C₅–C₉ boiling range or preferably in the C₆–C₈ boiling range. Also usable are higher ethers B. P. 80°–120° C., such as dipropyl ether, butyl ethyl ether, etc., or halogenated hydrocarbons such as ethylene di- and trichloride, beta trichloroethane, 1,2 dichloropropane, etc. The inclusive preferred boiling point range for the solvents is 50°–150° C. The solvent/perchloromethyl mercaptan ratio utilized is in the range of 1/0.2 to 1/2, preferably 1/0.3 to 1/1 on a volume basis.

As stated before, the perchloromethyl mercaptan is preferably added to the reaction mixture dissolved in the saturated hydrocarbon solvent. The reaction takes place in the same manner as detailed above except for that. The mixture is stirred until the pH of the aqueous medium reaches 7–8, and then filtered. Some organic solvent remains with the filter cake (or the product separated by any other separation process) and is removed by air drying or mild heating to a temperature of about 70° C.

The N-trichloromethylthioimides that can be prepared by the method of this invention include N - trichloromethylthio phthalimide, N-trichloromethylthio succinimide, N-trichloromethylthio endomethylenetetrahydrophthalimide, and chlorinated N-trichloromethylthio tetrahydrophthalimide. N - trichloromethylthio amides, described in U. S. Patent No. 2,553,775, can also be prepared by the method of this invention. Among the latter type compounds that can be prepared are N-trichloromethylthio-2,4-dioxothiazolidine, N - trichloromethylthio-5,5-dimethyloxazolidine - 2,4-dione, N - trichloromethylthio-5-methyl-5-ethyloxazolidine - 2,4 - dione, N-trichloromethylthio-5,5 - pentamethyleneoxazolidine - 2,4-dione, N - trichloromethylthio-5-methyl-5-phenyloxazolidine-2,4-dione, N - trichloromethylthio-5-methyl-5-isobutyloxazolidine-2,4-dione, N-trichloromethylthio-5,5-dimethylhydantoin, 1-nitro-3-trichloromethylthio-5,5-dimethylhydantoin, 1-acetyl-3-trichloromethylthio-5,5 - dimethylhydantoin, 3-trichloromethylthio-5 - methyl -5 - isobutylhydantoin, N-trichloromethylthio-5 - isooctyloxazolidine-2,4-dione, N-trichloromethylthio - 5 - methyl - 5 - cyclopropyloxazolidine - 2,4 - dione, N-trichloromethylthio - N - butyl - benzenesulfonamide, and N-trichloromethylthio-N - phenylbenzene-sulfonamide.

The improved method of this invention is illustrated in the following examples.

*Example I*

151 grams (1 mole) of tetrahydrophthalimide were dissolved in 900 cc. of water containing 1 mole of NaOH. 186 grams (110 cc.) of ClSCCl₃ (1 mole) dissolved in 190 cc. of heptane were added from a dropping funnel to the rapidly stirred solution over a period of 7 minutes. The temperature of reaction was maintained at 20° C. After completion of the reaction and isolation of the product, a product of 96.1% purity was obtained. A control was done in exactly the same manner except for the fact that no saturated hydrocarbon solvent was used. The purity of the latter was 92.7%. This is a significant difference in purity in a product designed for physiological use. In addition, the product prepared utilizing heptane had a mild odor, whereas the control had a very strong lachrymatory odor.

*Example II*

This run was carried out as in Example I, except that the 186 grams of perchloromethyl mercaptan were diluted to 350 ml. with n-heptane. The product in this case had a purity of 97.8%, indicating that the larger quantity of n-heptane removed additional volatile impurities.

*Example III*

A run was carried out as in Example I and the wet filter cake charged to a flask. Vacuum was applied and the evolved n-heptane and water collected in ice trays. Infra-red analysis of the heptane layer showed the presence of thiophosgene, perchloromethyl mercaptan and some unidentified impurities.

The method of this invention is also ideally adapted for the preparation of N - trichloromethylthio imides other than those of dicarboxylic acids, e. g. (N-trichloromethylthio) o-sulfobenzimide. As stated before, the method of this invention can also advantageously be employed for the preparation of N-trichloromethylthio amides, sulfonamides, and related compounds.

It is to be understood that the invention is not limited to the specific examples which have been offered merely as illustrations and that modifications may be made without departing from the spirit of the invention.

What is claimed is:

1. In a process for the preparation of an N-trichloromethylthio imide which comprises the steps of dissolving an imide in an aqueous alkaline solution of an alkali metal compound and reacting the resulting alkali metal imide product dissolved in the aqueous media with admixed perchloromethyl mercaptan, the improvement which comprises carrying out the reaction in the presence of a saturated $C_5$–$C_9$ hydrocarbon.

2. A process as in claim 1 in which the saturated hydrocarbon is an aliphatic hydrocarbon.

3. In a process for the preparation of an N-trichloromethylthio imide of a dicarboxylic acid which comprises the steps of dissolving an imide in an aqueous alkaline solution of an alkali metal compound and reacting the resulting alkali metal imide product dissolved in the aqueous media with admixed perchloromethyl mercaptan, the improvement which comprises carrying out the reaction in the presence of a saturated $C_5$–$C_9$ hydrocarbon.

4. A process as in claim 3 in which the saturated hydrocarbon is an aliphatic hydrocarbon.

5. A process as in claim 4 in which the N-trichloromethylthio imide is tetrahydrophthalimide, the alkali metal compound is sodium hydroxide, and the saturated hydrocarbon is heptane.

6. In a process for the preparation of an N-trichloromethylthio imide of a dicarboxylic acid which comprises the steps of dissolving an imide in an aqueous alkaline solution of an alkali metal compound and reacting the resulting alkali metal imide product dissolved in the aqueous media with admixed perchloromethyl mercaptan, the improvement which comprises adding the perchloromethyl mercaptan to the reaction mixture contained dissolved in a $C_5$–$C_9$ saturated hydrocarbon solvent therefor.

7. In a process for the preparation of an N-trichloromethylthio imide which comprises the steps of dissolving an imide in an aqueous alkaline solution of an alkali metal compound and reacting the resulting alkali metal imide product dissolved in the aqueous media with admixed perchloromethyl mercaptan, the improvement which comprises carrying out the reaction in the presence of a water-immiscible, saturated organic solvent for the perchloromethyl mercaptan, said organic solvent being a poor solvent for the N-trichloromethylthio imide and boiling in the range of 50°–150° C.

References Cited in the file of this patent

UNITED STATES PATENTS

| | | |
|---|---|---|
| 2,553,770 | Kittleson | May 22, 1951 |
| 2,653,155 | Kittleson | Sept. 22, 1953 |